(12) United States Patent
Schmidt (10) Patent No.: US 11,534,679 B2
(45) Date of Patent: Dec. 27, 2022

(54) LASER-ARRAYED IMMERSIVE AMUSEMENT ATTRACTION

(71) Applicant: Activate Games Inc., Winnipeg (CA)

(72) Inventor: Adam Schmidt, Winnipeg (CA)

(73) Assignee: Activate Games Inc., Winnipeg (CA)

(*) Notice: Subject to any disclaimer, the term of this patent is extended or adjusted under 35 U.S.C. 154(b) by 0 days.

(21) Appl. No.: 17/149,004

(22) Filed: Jan. 14, 2021

(65) Prior Publication Data

US 2021/0220725 A1 Jul. 22, 2021

(30) Foreign Application Priority Data

Jan. 20, 2020 (CA) ................................ CA 3068860

(51) Int. Cl.
*A63F 9/24* (2006.01)
*A63F 9/00* (2006.01)
*A63G 33/00* (2006.01)

(52) U.S. Cl.
CPC .............. *A63F 9/24* (2013.01); *A63F 9/0078* (2013.01); *A63F 2009/2402* (2013.01); *A63F 2009/2444* (2013.01); *A63F 2009/2451* (2013.01); *A63G 33/00* (2013.01)

(58) Field of Classification Search
USPC .......................................................... 463/9
See application file for complete search history.

(56) References Cited

U.S. PATENT DOCUMENTS

| | | | |
|---|---|---|---|
| 9,302,180 B2 | 4/2016 | Ziemkowski | |
| 2004/0198519 A1* | 10/2004 | Schober | A63G 31/00 472/136 |
| 2007/0114725 A1* | 5/2007 | Peck | G07F 17/3295 273/447 |
| 2012/0085663 A1* | 4/2012 | Ziemkowski | A63G 31/00 206/216 |
| 2012/0120973 A1* | 5/2012 | Ziemkowski | A63G 33/00 372/29.02 |
| 2015/0177006 A1* | 6/2015 | Schulz | G01C 21/3407 701/537 |
| 2016/0274539 A1* | 9/2016 | Smithwick | G02B 5/32 |
| 2017/0043268 A1* | 2/2017 | Briggs | A62B 35/0087 |
| 2019/0143156 A1* | 5/2019 | Weston | A63G 21/20 104/91 |
| 2020/0400867 A1* | 12/2020 | Blum | A63J 25/00 |

* cited by examiner

*Primary Examiner* — Pierre E Elisca
(74) *Attorney, Agent, or Firm* — Kyle R Satterthwaite; Ryan W Dupuis; Ade & Company Inc.

(57) ABSTRACT

An immersive amusement system features a path to be traversed by participants, a first array of devices mounted on a first side of said path, and a second array of devices mounted on an opposing second side of said path. Each device comprises either a beam emitter operable to transmit a respective visible beam, or a beam receiver operable to detect receipt thereby of a visible beam. The arrayed devices are setup in co-operable pairs, of which each co-operable pair comprises a beam emitter in one of said arrays and a corresponding beam receiver in the other of said arrays. A controller operably connected to the arrayed devices is configured to selectively activate and deactivate said beam emitters to cause transmission of visible beams from said beam emitters to said corresponding beam receivers, and to monitor for breaking of any of said visible beams by any of said participants.

20 Claims, 6 Drawing Sheets

LASER-ARRAYED IMMERSIVE AMUSEMENT ATTRACTION

CROSS-REFERENCE TO RELATED APPLICATIONS

This application claims foreign priority benefit under 35 U.S.C. 119(a) of Canadian Patent Application 3,068,860, filed Jan. 20, 2020, the entirety of which is incorporated herein by reference.

FIELD OF THE INVENTION

The present invention relates generally to amusement attractions, and more particularly to laser-based amusement attractions in which participants occupying an immersive interactive game environment must perform assigned tasks while avoiding breakage of laser beams spanning across a travel path of said environment.

BACKGROUND

In recent years, escape rooms have become a popular form of immersive, live-action amusement attraction, providing an alternative to more conventional indoor amusement attractions such as laser tag, and to large scale amusement parks that are cost prohibitive, particularly in smaller markets and/or those where outdoor parks are subject to seasonal constraints in climates of notable temperature variation.

Another type of more indoor amusement attraction is a laser maze attraction, such as that disclosed in U.S. Pat. No. 9,302,180, where a participant must navigate their way through a pathway that is partially obstructed at various points by laser beams around which the participant must maneuver by twisting around, crawling under, ducking under or stepping or jumping over such laser beams. Employed as a maze challenge, a scoring scheme is implemented with a combination of a running timer and penalties applied for breaking of any laser beams.

While the aforementioned patent contemplates combination of the laser-based maze challenge with other challenges for increased complexity and unique collective experience, there remains room for novel developments and improvements in relation to the laser system and control methodology for a improved and varietal participant experience.

SUMMARY OF THE INVENTION

According to a first aspect of the invention, there is provided an amusement system comprising:
 a path to be traversed by one or more participants;
 a first array of devices mounted on a first side of said path;
 a second array of devices mounted on an opposing second side of said path in matching layout to said first array, wherein each device in the first and second arrays comprises either a beam emitter operable to transmit a respective visible beam or a beam receiver operable to detect receipt thereby of a visible beam, and the devices of the first and second arrays are setup in co-operable pairs, of which each co-operable pair comprises a beam emitter in one of said arrays that is aimed at a corresponding beam receiver in the other of said arrays; and
 a controller operably connected to devices of both the first and second arrays and configured to selectively activate and deactivate said beam emitters to cause transmission of visible beams from said beam emitters to said corresponding beam receivers, and to monitor the beam receivers for breaking of any of said visible beams by any of said participants.

According to a second aspect of the invention, there is provided a method of operating an immersive amusement system, said method comprising:
 providing a path having disposed on opposing first and second sides thereof first and second arrays of devices, of which each device comprises either a beam emitter operable to transmit a respective visible beam or a beam receiver operable to detect receipt thereby of a visible beam, and among which the devices are setup in co-operable pairs in which each beam emitter aims the respective visible beam transmitted thereby at a corresponding beam receiver; and
 under automated control by a controller, performing a moving-beam sequence simulating one or more traveling laser beams by activating and deactivating the beam emitters of the co-operable pairs in sequential fashion along a series of said co-operable pairs.

According to a third aspect of the invention, there is provided a method of operating an immersive amusement system, said method comprising:
 providing a path having disposed on opposing first and second sides thereof first and second arrays of devices, of which each device comprises either a beam emitter operable to transmit a respective visible beam or a beam receiver operable to detect receipt thereby of a visible beam, and among which the devices are setup in co-operable pairs in which each beam emitter aims the respective visible beam transmitted thereby at a corresponding beam receiver; and
 under automated control by a controller, activate the beam emitters of a plurality of adjacent co-operable pairs to create a visible obstacle that measures multiple beams across in at least one direction.

BRIEF DESCRIPTION OF THE DRAWINGS

One embodiment of the invention will now be described in conjunction with the accompanying drawings in which.

DETAILED DESCRIPTION

Figure 1:
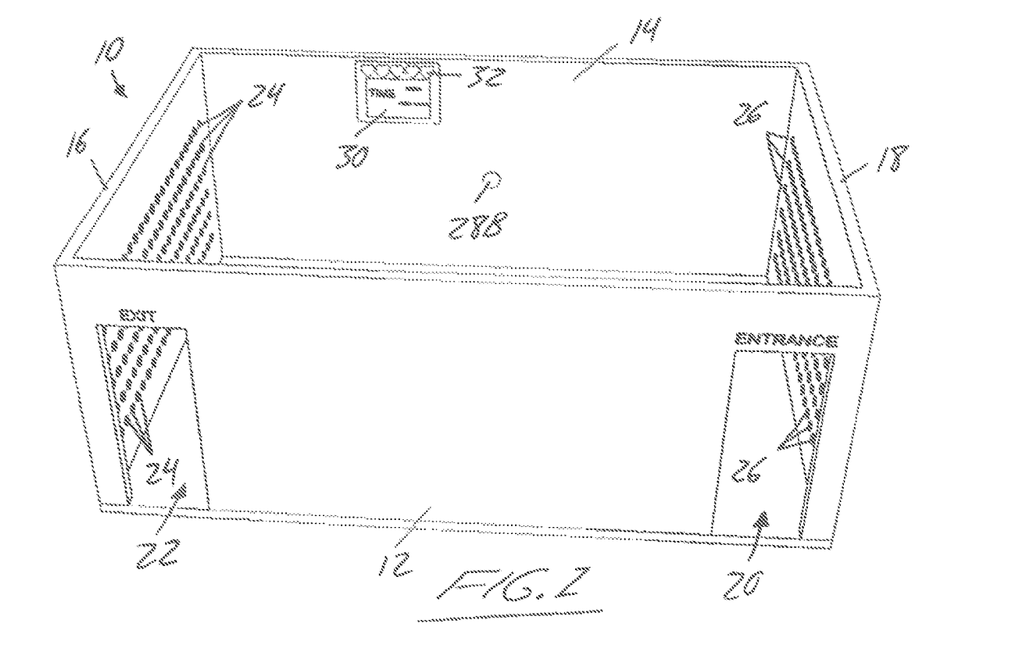
FIG. 1 is a perspective view of an immersive amusement environment employing laser beam emitters and receivers arrayed on opposing walls of the environment, whereby selectively generated laser beams can be used to create a dynamically variable obstacle course within the environment.

Referring to FIG. 1, an immersive amusement environment 10 is shown in the form of an enclosed rectangular game room having a front end wall 12, an opposing rear end wall 14, a first side wall 16 and an opposing second side wall 18. The front end wall 12 features an entrance 20 and a separate exit 22 therein, for example near respective ends of the front end wall 12, though the game room may alternatively have a shared entrance/exit opening by which the game room's interior space is both entered and exited. In embodiments with a separate entrance and exit, they need not be located at the same wall.

The first side wall 16 has a plurality of laser beam emitters 24 mounted thereon in a rectangularly arrayed grid pattern spanning a substantial, but less than full, surface area of the first side wall 16. These laser beam emitters 24 are thus laid out in aligned horizontal rows and aligned vertical columns, where each row of emitters 24 lies horizontally of the first side wall 16 at a respective elevation thereon between the floor and ceiling of the game room, and each column of emitters 24 lies vertically of the first side wall at a respective distance between the two ends of the first side wall 16. The second side wall 18 has a plurality of laser beam receivers 26 mounted thereon in a matching rectangularly arrayed grid pattern likewise spanning a substantial, but less than full, surface area of the second side wall 18. The laser beam receivers 26 are thus laid out in aligned horizontal rows and aligned vertical columns, where each row of receivers 26 lies horizontally of the second side wall 18 at a respective elevation thereon between the floor and ceiling of the game room, and each column of receivers lies 26 vertically of the second side wall at a respective distance between the two ends of the second side wall 18. The position of each emitter 24 on the first side wall 16 matches the position of a corresponding receiver 26 on the second side wall 18, and each emitter 24 is aimed so that a laser beam generated thereby, when activated, is transmitted to the matching receiver 26 on the opposing wall on a respective linear axis perpendicular to the two side walls. The aimed linear axes of the emitters 24 are all parallel with one another. Each receiver 26 comprises an optical sensor, e.g. photodiode, operable to detect receipt of the laser beam transmitted thereto by the emitter and provide distinguishable output signals according to the detected presence or absence of such laser beam.

Each emitter 24 and its respective receiver 26 thus define a co-operable device pair capable of transmitting a laser beam from one side of the game room, and detecting its receipt at the opposing side of the room. While the illustrated example places all the emitters 24 on one side of the game room, and all the receivers 26 on the opposing side of the game room, this need not be the case. That is, one co-operable device pair may have its emitter 24 on the first side wall 16 and its receiver on the second side wall, while another co-operable device pair can be installed in the reverse relationship, and thus have its receiver 26 on the first side wall 16 and its emitter 24 on the second side wall 18.

The devices in each array are uniformly spaced from one to the next in each row, and uniformly spaced from one to the next in each column. The center-to-center horizontal spacing between the devices of each row (hereafter the "horizontal device spacing") does not exceed 18-inches in one preferred implementation, and more particularly does not exceed 15-inches in another preferred implementation. The horizontal device spacing is at least 6-inches in one preferred implementation, and more particularly is at least 9-inches in another preferred implementation. In one particular example, the horizontal device spacing measures approximately 12-inches, thereby making it potentially possible for most young children (e.g. of 12-years and under) of average size to stand statically upright between two adjacent columns, in an orientation facing along the path, without obstructing the laser beams of either column when active, but making this more challenging to older/larger participants of greater body size, as well as to younger participants having smaller size but less refined body coordination.

The center-to-center vertical spacing between the devices of each column (hereafter the "vertical device spacing") may be equal or similar to the horizontal device spacing. In some preferred implementations however, the inter-row spacing may be less than the horizontal device spacing to provide greater distribution density in the vertical direction than in the horizontal direction, thereby increasing the overall quantity of lasers in the room for greater visual effect, without sacrificing the aforementioned ability for participant's to strategically use the larger horizontal device spacing to complete the challenges. The vertical device spacing does not exceed 16 inches in one preferred implementation, and more particularly does not exceed 12-inches in another preferred implementation. The vertical device spacing is at least 4-inches in one preferred implementation, and more particularly is at least 6-inches in another preferred implementation. In one particular example, the vertical device spacing measures approximately 8-inches, thus measuring approximately two-thirds of the larger 12-inch horizontal device spacing.

Figure 2:
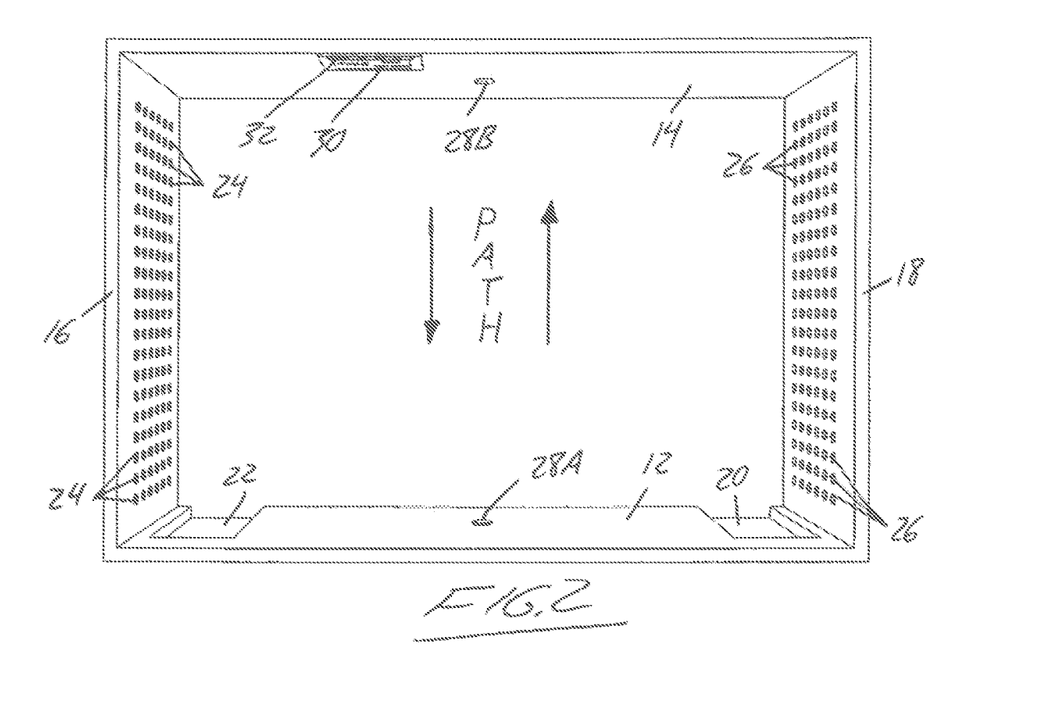
FIG. 2 is a top plan view of the immersive amusement environment of FIG. 1.

Referring to FIG. 2, open floor space between the front and rear end walls 12, 14 of the game room denotes a path over which one or more participants can travel back and forth between the front and rear ends of the game room, as delimited by the front and rear end walls 12, 14. Selective activation of one of the emitters 24 transmits a laser beam across this path, forming a visible (but non-physical) obstacle to be avoided by a participant of the amusement environment during said participant's traversal from one end of the path to the other. By dynamically changing which one or more of the emitters 24 are active, a different laser-based obstacle course is thus created within the amusement environment 10.

In the illustrated embodiment, a respective target device 28A, 28B is mounted to each of the front and rear end walls 12, 14 so as to reside at a respective end of the path, and is used to detect physical user-input from a participant to confirm that participant's successful traversal of the path from one end thereof to the other, across the laser-based obstacle course. Each target device 28A, 28B may be a push-button device, touch-sensitive panel, or any other electronic device capable of receiving a physical input denoting an actuation of said device. While the illustrated example features only two target devices, one at each end of the path, more than one target device may optionally be provided at one or both ends of the path.

As can be seen in FIG. 1, in addition to the target devices, the interior space of the game room in the illustrated embodiment also includes at least one performance display operable to display performance feedback to the participant(s) during a gameplay session. The performance display(s) may, for example, show one or more of: a score tally of incrementing/decrementing points values during successful completion or failure of tasks (e.g. incremented points for successful activation of target 28A, 28B; or decremented points for breaking of a laser beam), a running timer, and/or a status meter whose level is incremented or decremented in response to detected failures (breaking of a laser beam), similar to a life-bar or health-meter of a video game. In the illustrated embodiment, instead of maintaining a separate score tally, a countdown timer is alone used to both limit the duration of a gameplay session, and to at least partially govern a scoring scheme under which points are only awarded at the end of the gameplay session if all assigned tasks are completed before expiry of the countdown timer. If the countdown timer expires and any assigned task remains incomplete, the participant(s) is/are deemed to have lost the game, and no points are awarded. If all assigned tasks are completed before expiry of the countdown timer, then the participant(s) is/are deemed to have won the game, and is/are awarded a score value equal to the value of the countdown timer at the point in time when the final task was completed. If the life/health status of the status meter reaches zero before expiry of the countdown timer, the gameplay session is terminated prematurely, with the participant(s) being deemed to have lost the game, and therefore being awarded no points regardless of the value of the countdown timer at the premature termination of the gameplay session.

In the illustrated example, the running value of the countdown timer is shown on a score display 30, for example a wall-mounted flat-screen monitor, and the status meter is shown in a separate status display 32, for example in the form of a plurality of discrete illuminable indicators each representing a respective life or health point that changes from one status to another (lit or unlit) in response to a detected gameplay failure. For example, a series of heart-shaped indicators may initially occupy a fully lit state representing a full-life or full-health status of maximum lives or hit-points, and then be turned off one-by-one in response to each gameplay failure detected in the game session, until none of the indicators are lit. Alternatively, rather than the discrete indicators being heart-shaped to denote health or livelihood when illuminated, they may be X-shaped or skull-shaped to denote health damage or loss of life, thus all starting in an unlit state and then being illuminated one-by-one in response to gameplay failures until all indicators are illuminated. Either way, once all the indicators have changed state, this denotes a loss of the game by its participants, i.e. a "game over" status. The status display 32 may optionally be incorporated into the score display 30. Instead of using the timer for one-time score determination at the end of a won game, an accruing score tally may be instead maintained independently of the timer during the gameplay session, in which case the running score tally may be shown on the score display 30, optionally together with the running countdown timer.

Figure 3:
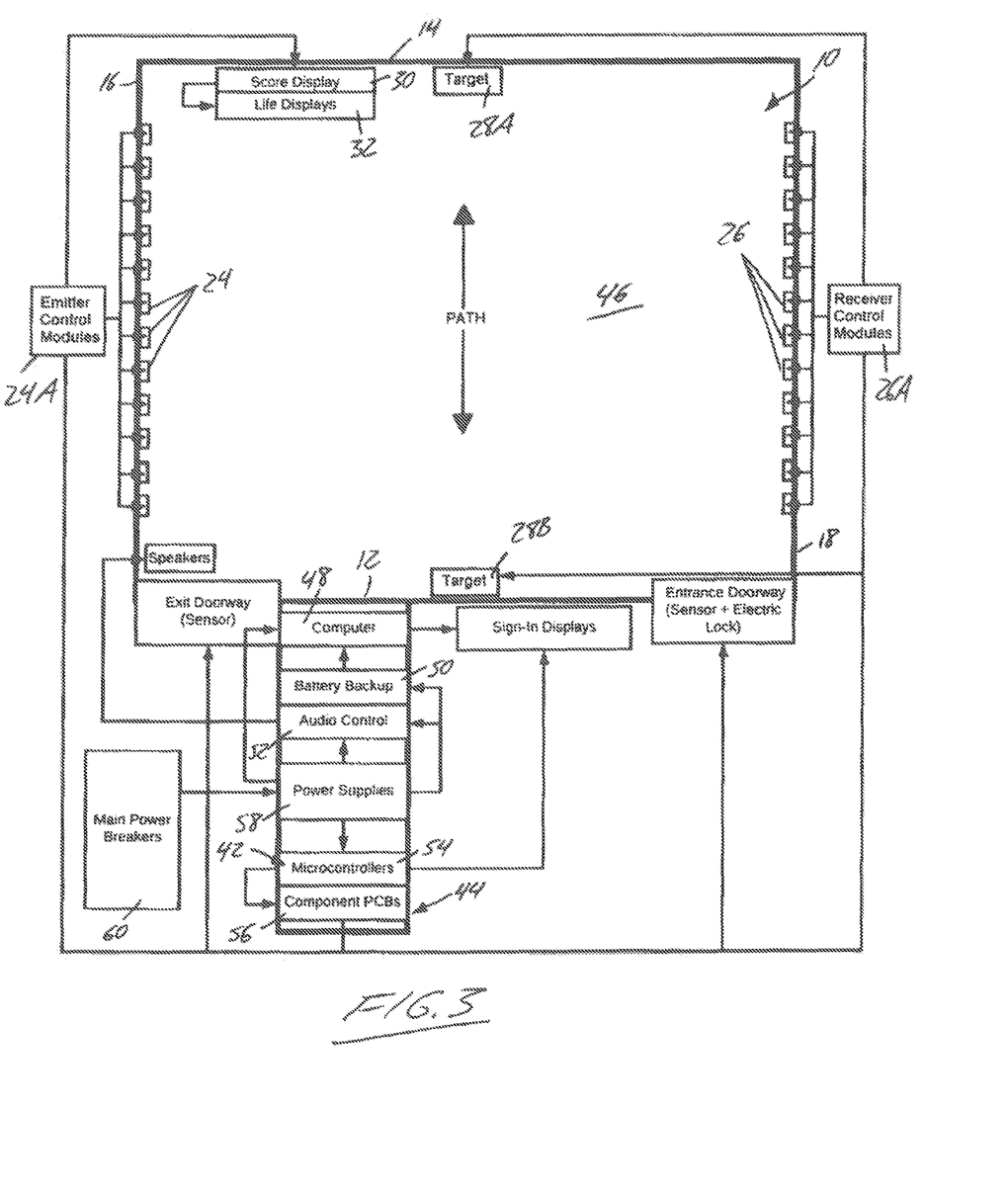
FIG. 3 is a schematic illustration of a control system for the laser emitters, receivers and other operating components of the immersive amusement environment of FIG. 1.
Figure 4A:
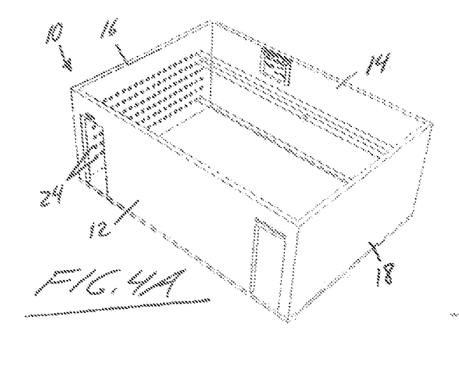
FIG. 4A is another perspective view of the immersive amusement environment, showing a select group of the laser emitters activated in first stage of a horizontally-moving beam sequence using sequential activation and deactivation of laser beams in horizontal series to simulate horizontal movement of laser beams across the immersive amusement environment.
Figure 4B:
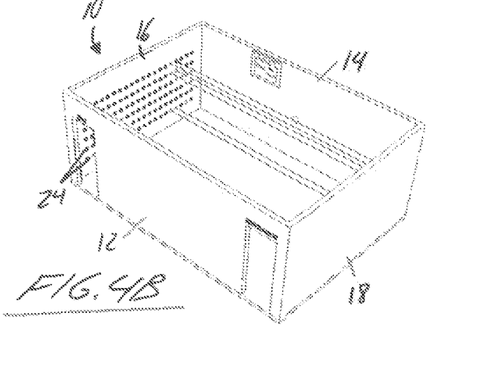
FIGS. 4B through 4F illustrate subsequent stages of the horizontally-moving beam sequence.
Figure 4C:
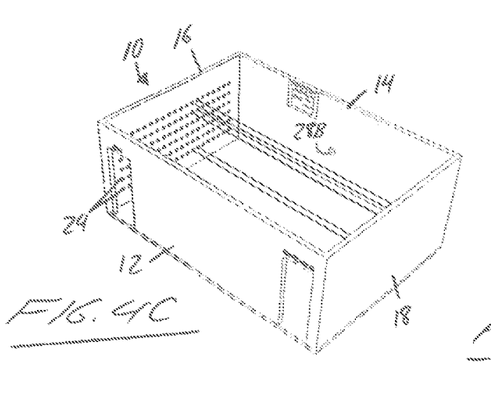
Figure 4D:
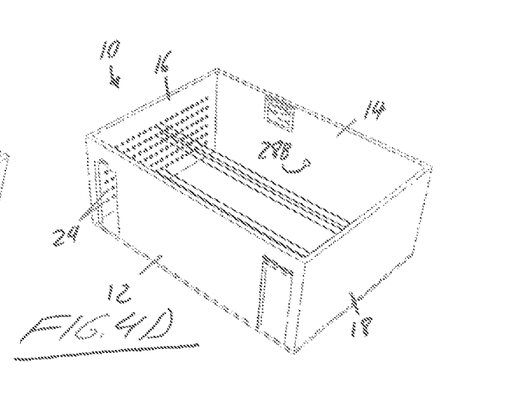
Figure 4E:
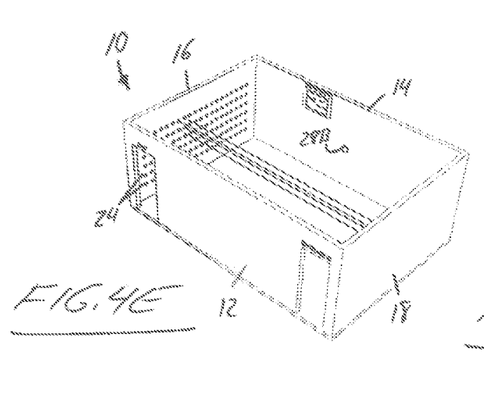
Figure 4F:
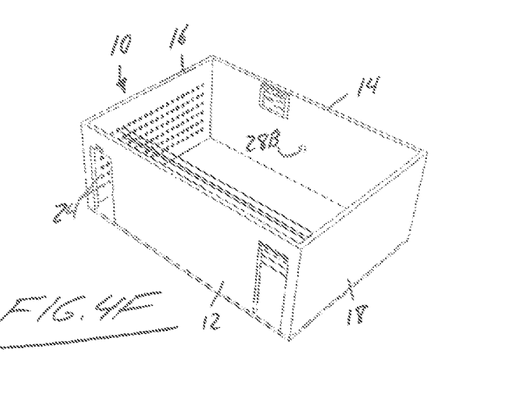
Figure 5A:
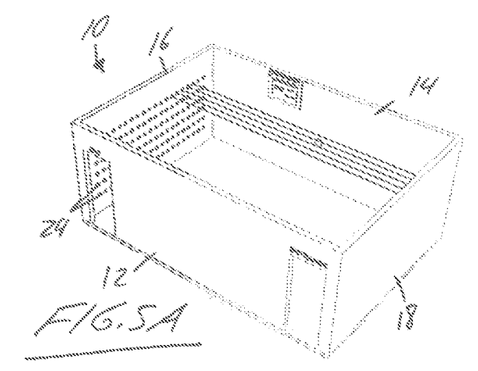
FIG. 5A is another perspective view of the immersive amusement environment showing a first stage of a vertically-moving beam sequence using sequential activation and deactivation of laser beams in vertical series to simulate vertical movement of laser beams within the immersive amusement environment.
Figure 5B:
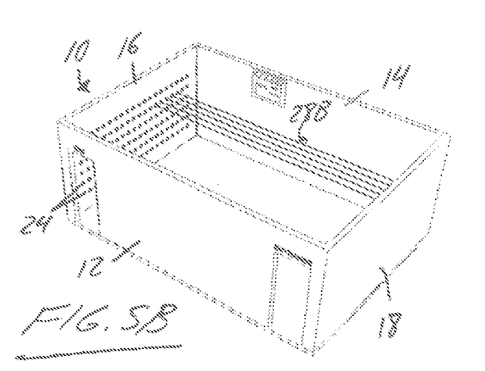
FIGS. 5B through 5E illustrate subsequent stages of the vertically-moving beam sequence.
Figure 5C:
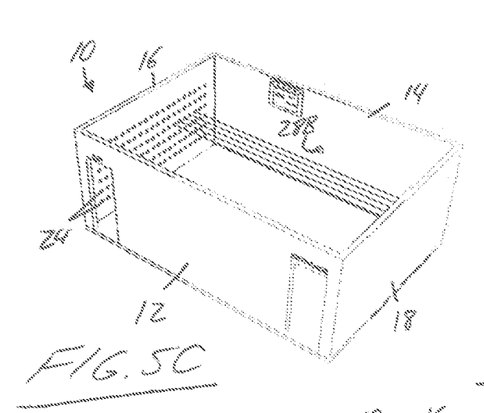
Figure 5D:
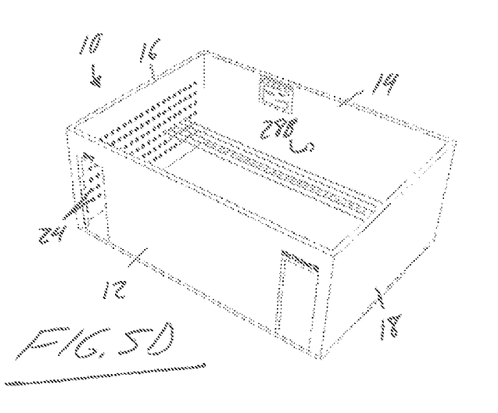
Figure 5E:
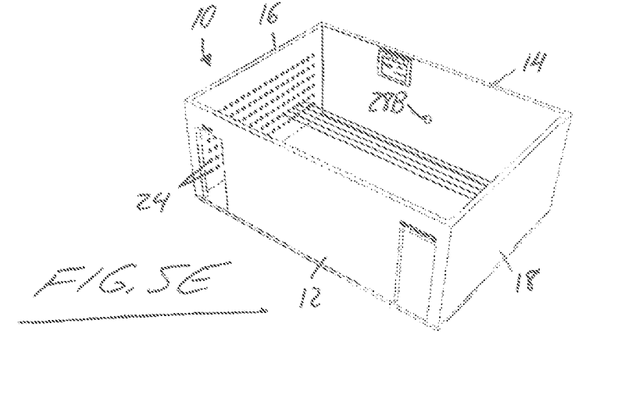
Figure 6A:
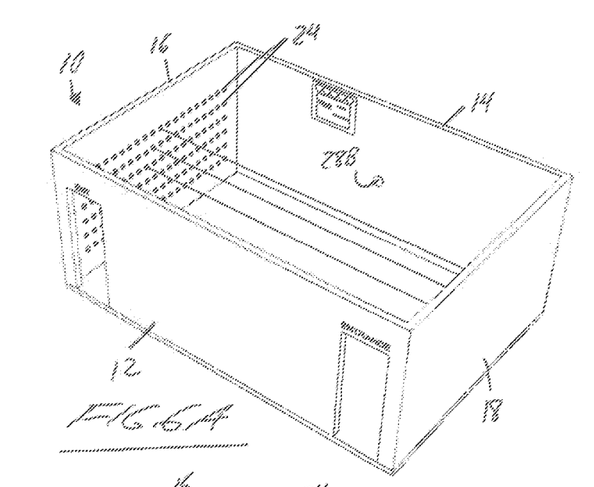
FIG. 6A is another perspective view of the immersive amusement environment showing a first stage of a diagonally-moving beam sequence using sequential activation and deactivation of laser beams in diagonal series to simulate diagonal movement of laser beams within the immersive amusement environment.
Figure 6B:
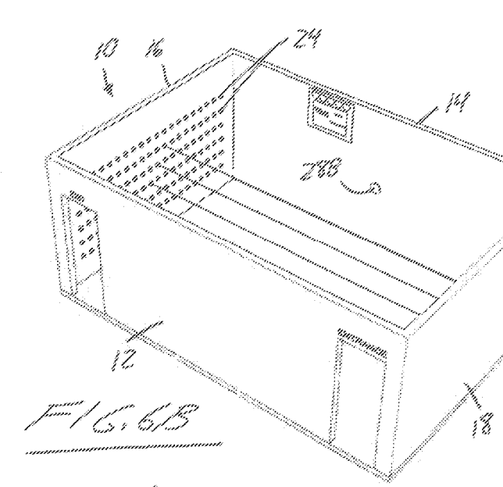
FIGS. 6B through 6D illustrate subsequent stages of the vertical laser sequence.
Figure 6C:
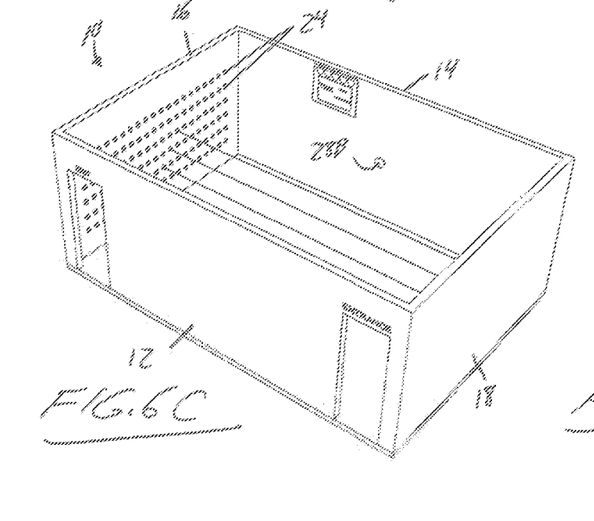
Figure 6D:
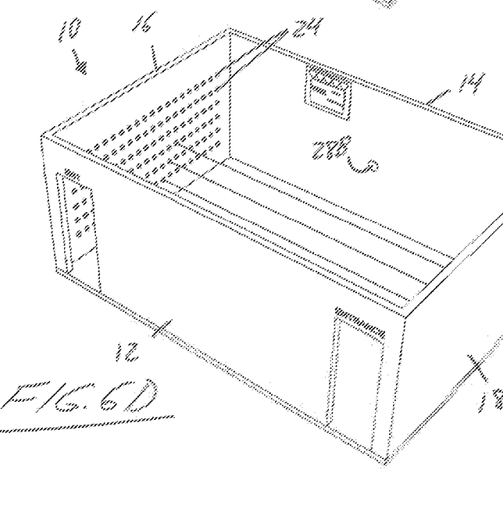

FIG. 3 schematically illustrates a room control system 40 of the game room 10. The room control system 40 features a collection of control hardware 42, preferably stored in a utility closet 44 situated outside the interior gaming space 46 of the game room 10. In the illustrated embodiment, the control hardware 42 includes one or more local computers 48, a battery backup 50, audio control components 52 including at least an audio amplifier, microcontrollers 54, component PCBs 56, and power supplies 58 through which the other control hardware components are powered via main power breakers 60 situated further upstream in the facility's electrical system. Based on input commands from the local computer 48 during execution of game-control software installed thereon, the micro-controllers 54 drive the component PCBs of gameplay elements installed within the internal space of the room for interaction therewith by participants during gameplay. Accordingly, the control hardware 42 collectively forms a controller that governs automated execution of a gameplay session within the internal space of the game room. The audio control components 52 are connected to one or more loudspeakers 54 likewise installed in the internal space of the game room 10 for playback of game-related audio to the participants during such gameplay, for example verbal commands guiding the participants as to assigned tasks they are to perform during the gameplay session.

The room control system 40 may be one of a plurality of room control systems that are installed among a plurality of respective game rooms in a shared facility, and are networked together over a local area network as part of a larger overall computerized facility management system. Such facility management system may include a facility management server that hosts, or is communicable with, a local participant database for storing participant profiles and associated scoring records of the participants. There may also a central participant database that is hosted remotely of the facility, for example in a cloud server environment, and is communicable with the facility management server via the internet or another wide area network so that participant profiles from the local participant database can be used to populate the central participant database. The facility management servers of additional facilities can thus access and populate the central participant database, whereby a participant can attend multiple facilities and the scoring results from games played at multiple facilities can be compiled together. Further details on the facility management system, and functions of the room control system 40 other than the laser-based gameplay processes described herein, are disclosed in Applicant's prior U.S. Provisional Patent Application No. 62/846,912, filed May 13, 2019, the entirety of which is incorporated herein by reference.

In the illustrated embodiment of the present invention, the game elements operated by the controller 42 include the aforementioned laser emitters 24 and cooperating receivers 26, which are operated through respective control modules 24A, 26A, as shown in FIG. 3; the aforementioned target devices 28A, 28B; and the aforementioned score/timer display 30 and status display 32. The controller is configured to enable selective activation of any one or more of the emitters 24 by sending an energization signal thereto, and for each activated emitter 24, monitor the output signal from the corresponding receiver 26 for the duration of time that the energization signal is maintained on the emitter 24 (the "energization period"). Positive detection of intensive incident light by the receiver sensor confirms reception of the laser beam being transmitted by the respective emitter 24, while the absence or interruption of such detection during the energization period denotes that laser beam has been interrupted (i.e. broken or tripped by an obstruction some-where between the emitter and the receiver). Accordingly, detected beam absence by the receiver of an actively energized emitter can be used to determine that a participant traversing the path in the immersive amusement environment has broken or tripped the subject laser beam transmitted by that actively energized emitter. Though not shown in the illustrated example, the controller is also preferably connected to a fog or haze machine for automated operation thereof to intermittently dispense fog or haze into the room, for example based on visibility levels therein. The introduction of fog or haze improves the visibility of the laser beams to the participant(s).

Having described the general componentry and layout of the immersive amusement environment 10, a particularly novel and beneficial use of the arrayed layout of emitters and receivers therein is now described, starting with reference to FIG. 4. Each individual emitter is a static non-moving device, mounted at a fixed location on the respective wall 16 of the environment 10, thus being operable only to transmit its respective laser beam in a singular predetermined direction, which in the illustrated example is on a linear axis perpendicular to both the respective wall 16 on which the emitter is mounted and the opposing wall 18 to which the beam is transmitted. However, it will be appreciated that the geometry of the environment and the angle of the beam axis relative to the wall surfaces of the environment may vary. However, with the placement a significant quantity of such static laser devices in an arrayed layout, the system can simulate the appearance of a moving/traveling laser beam through operation of the controller in a manner performing sequential activation and deactivation of a series of lasers in any direction (horizontal, vertical, diagonal) within the array.

FIGS. 4A through 4F illustrate one example of a horizontally-moving beam sequence for simulating one or more horizontally traveling laser beams. To achieve this effect, a respective series of beam emitters 24 in one or more horizontal rows of the emitter array are sequentially activated and deactivated in ordered fashion starting from at or near one end of the row and moving toward the opposing end of the row. As shown in the illustrated example, multiple beam emitters 24 may be active at any given point in the sequence, including optional simultaneous energization of more than one emitter 24 in a given row of emitters, thereby simulating a plurality traveling beams traveling synchronously across the room in a horizontal direction along the path traversed by the participants.

The illustrated example particularly denotes a scenario in which the series of emitters are activated in sequential fashion moving toward the front wall 12 of the room, which would typically be performed in an instance where participants are tasked with actuation of the target 28B on the opposing rear wall 14 of the room, so that the participant travel direction toward the currently assigned rear target 28B opposes the direction in which the emitters 24 are being sequentially energized (i.e. the travel direction of the simulated traveling beam). The simulated traveling beam thus advances toward the participants from the direction faced thereby. The illustrated example shows three rows of emitters 24 being used in the sequence, specifically the bottommost row of emitters 24 whose simulated traveling beam(s) represent(s) a visible single-level lower obstacle over which a participant must step or jump, and two uppermost rows of emitters 24 whose simulated traveling beams represent a taller multi-level upper obstacle below which a participant must remain while stepping or jumping over the lower obstacle. So, for example, successful passage of this upper and lower obstacle combination may require the participant to step over the lower obstacle with their torso in a hunched-over position to avoid the upper obstacle. A simpler horizontally-moving beam sequence may employ only a lower obstacle over which a participant must step or jump, or only an upper obstacle under which a participant must hunch, duck, crouch or crawl. It will be appreciated that any visible obstacle may be varied in the number of levels it spans, i.e. how many rows of emitters are used, which dictates how many beams tall the obstacle is, from as small as a single-level obstacle having a height that's only one beam tall to a several-level obstacle having a height that is several beams tall, taking into account the practical consideration of how high an average participant can likely jump over a lower obstacle, or how low an average participant can hunch, crouch or crawl under an upper obstacle.

The illustrated example of the horizontally-moving beam sequence shows two emitters 24 being simultaneously energized in each row, whereby each obstacle is two-beams deep in horizontal measure, creating a greater participant challenge than clearing of a shallower obstacle that is only one beam deep. It will be appreciated that deeper obstacles exceeding a two-beam depth may be created, with the upper limit being determined based on a combination of the inter-beam distance dictated by the grid spacing of the array, and the practical consideration the physical abilities of a typical participant so as not to create challenges that are inherently unpassable.

In view of the demonstration of embodiments where the visible obstacle may be more than two-beams deep, it will be appreciated that the described sequential activation and deactivation of emitters in a given series of emitters need not always refer to the scenario where the emitter being deactivated and the emitter being activated are immediately adjacent to one another in the series. For example, with reference to the bottom row of emitters in FIG. 4A, and considering the emitter nearest the rear wall 14 of the room to be the "first" emitter of the row, due to forwardly moving direction of the simulated traveling beam in the illustrated example, the initial stage of the horizontally-moving beam sequence in FIG. 4A features energization of the first and second emitters by the controller 42. To step to the next stage of the sequence, the controller 42 maintains the energized state of the second emitter of the row, while deactivating the first emitter of the row and activating the third emitter of the row in place of the now-deactivated first emitter.

So, in general, for a given series of emitters selected to perform a moving-beam sequence, that series of emitters spans from a starting emitter at which the sequence starts to a final emitter at which the sequence ends. The starting emitter and final emitter may for example be the first and last emitters of a row, in which case the series comprises the entire row, over which the simulated moving obstacle will thus travel an entire length of the row from end to end. In the first stage of the sequence, a first subset of the series of emitters that is equal in quantity to the desired obstacle depth in that row is activated, and includes at least the starting emitter. To step to the next stage in the sequence, a previously inactive emitter outside the active subset of the preceding stage, but nearest to that subset in the advancing direction of the sequence (forward, in the illustrated example), is activated; and the earliest emitter of the active subset of the preceding stage (i.e. the emitter thereof nearest to the starting emitter) is deactivated. In the first instance of such step, the earliest emitter being deactivated is the starting emitter itself. This step is then repeated on an ongoing basis, advancing through the stages of the sequence, until the latest activated emitter is the final emitter of the series, at which point a final step of the sequence involves no activation of a subsequent emitter, and instead features deactivation of the earliest emitter of the active subset of the preceding stage, followed by sequential deactivation of any remaining emitters in the active subset of the current stage, from earliest to latest. Where the subset size is one, this procedure creates an obstacle depth of one beam in the given series, in which the emitter being activated and the emitter being deactivated at any step are always direct neighbours in the series, thus simulating a singular traveling beam in that series. Regardless of the subset size, the emitter being activated and the emitter being deactivated at any step, other than the finishing step, are always separated from one another by an emitter spacing of N−1, where N is the subset size. So, for a subset size of one, the emitter spacing is zero, and so that the activated and deactivated emitters at any given step are direct neighbours. So, for a subset size of two, the emitter spacing is one, and so that the activated and deactivated emitters at any given step are spaced apart by one intermediate emitter, which is held active during that step.

The horizontally-moving beam sequence in FIG. 4 is a three-series sequence with a series subset size of two emitters in each series, for a total of six beams, of which four beams form an upper obstacle that is two-beams tall and two-beams deep, and the remaining two beams form a lower obstacle that is one beam tall and two beams deep. While this example features an equal beam depth in each series, this need not be the case in all instances. While the illustrated example of FIG. 4 shows the sequence advancing forwardly toward the front wall 12 of the room 10, for example to create one or more simulated forward-moving obstacles during rearward traversal of participants along the laser-crossed path toward the rear target 28B on the rear wall 14, it will be appreciated that another rearwardly advancing sequence may be performed in the same manner toward the rear wall 14 of the room, for example to create one or more simulated rearward-moving obstacles during forward traversal of participants along the laser-crossed path toward the front target 28A on the front wall 12. Accordingly, a gameplay session may include execution of forward and rearward moving-beam sequences in alternating fashion, along with likewise alternating assignment of the front and rear target devices 28A, 28B as the intended goal to be reached by the participants traversing the path in alternating directions. While the illustrated example shows only a set of simulated horizontally-moving obstacles, with no static obstacles generated by one or more constantly-on beams whose emitters are maintained in a continuously active state, other scenarios may involve a combination of one or more simulated moving obstacles with one or more such static obstacles.

FIGS. 5A through 5E illustrate one example of a vertically-moving beam sequence for simulating one or more vertically traveling laser beams. To achieve this effect, a series of beam emitters 24 in one or more vertical columns of the emitter array are sequentially activated and deactivated in ordered fashion starting from at or near one end of the column and moving toward the opposing end of the column. Typically, this sequence will then be repeated in the reverse direction, whereby the simulated traveling beam(s) travel vertically up and down the column(s) in ongoing alternating fashion. This simulated vertically-moving obstacle requires a participant to either step or jump over the simulated obstacle while at a sufficiently low elevation point in its vertical travel range; or hunch, crouch or crawl under the simulated obstacle while at a sufficiently high elevation point in its vertical travel range. The sequencing steps are the same as for the horizontally-moving beam sequence of FIG. 4, except that each "series" occupies a respective column of the array, rather than a row thereof, and the active subset quantity in each series defines a vertical height measurement of the obstacle, rather than the horizontal depth thereof.

The illustrated example in FIG. 5 shows a simulated vertically-moving obstacle that is one-beam tall and four-beams deep, thus involving sequential operation of four column-based series of emitters, with an active subset size of one emitter per series. The illustrated example thus has notable horizontal depth, likely requiring a participant to jump, rather than step, over the obstacle if attempting to clear the obstacle from above. At the same time, the obstacle has a relatively small height of one-beam, thus leaving notable vertical clearance to hunch or duck under the obstacle, without necessarily having to crawl, if attempting to clear the obstacle from below. Simpler sequences may have a lesser obstacle depth, from as little as one-beam deep, and more complex sequences may have greater obstacle height. While the illustrated example shows only one simulated vertically-moving obstacle, other scenarios may employ multiple vertically-moving obstacles at different points along the participant path. Other scenarios may involve a combination of one or more simulated vertically-moving obstacles, with one or more static obstacles, and/or one or more simulated horizontally-moving obstacles. For example, the FIG. 5 scenario employs four columns of the emitter/receiver arrays near the rear wall 14 of the room 10, leaving a greater number of columns available between the simulated vertically-moving obstacle to host one or more one or more static obstacles, and/or one or more simulated horizontally-moving obstacles using one or more row-based series that each occupy only a partial row-length that is unused by the simulated vertically-moving obstacle.

FIGS. 6A through 6D illustrate one example of a diagonally-moving beam sequence for simulating one or more diagonally traveling laser beams. To achieve this effect, instead of a row-based or column-based series of beam emitters 24 being selected from within a singular row or column of the emitter array for sequential activation/deactivation of emitters along that series, a diagonal-series of emitters 24 are selected among a plurality of adjacent rows and adjacent columns in the array. The illustrated example shows use of three diagonal series, each having a single-emitter subset size, and each having a downwardly and rearwardly angled travel sequence for its respective simulated traveling beam. A rearmost one of these three diagonal series resides nearest the rear wall 14 of the room 10, and has a starting emitter situated in the top row of the emitter array at a position situated ten-emitters in from the rear end of the array, and a final emitter situated in the third-bottom row at a position situated seven-emitters in from the rear end of the array. A middle one of the three diagonal series has a starting emitter situated in the second-top row of the emitter array at a position situated eleven-emitters in from the rear end of the array, and a final emitter situated in the second-bottom row at a position situated eight-emitters in from the rear end of the array. A forwardmost one of the three diagonal series has a starting emitter situated in the third-top row of the emitter array at a position situated twelve-emitters in from the rear end of the array, and a final emitter situated in the bottommost row at a position situated nine-emitters in from the rear end of the array.

The sequencing steps are the same as for the horizontally-moving and vertically-moving beam sequences of FIGS. 4 and 5, except that each "series" occupies a respective diagonal of the array, rather than a horizontal row or vertical column thereof, and the active subset quantity contributes to both the vertical height and horizontal depth of simulated moving obstacle. Likewise, where multiple neighbouring diagonal series are used, the quantity of such neighbouring diagonal series also contributes to both the vertical height and horizontal depth to the overall simulated moving obstacle collectively formed by the sequentially activated beams of the multiple series. In the illustrated example, the three respective beams of the three diagonal series create an obstacle resembling a singular inclined plane whose slope direction mirrors its simulated diagonal travel direction across a vertical reference plane lying parallel to the beam axes. That is, the inclined plane slopes upwardly and rearwardly, while its travel direction slopes downwardly and rearwardly. If each series of this three-series example had an active emitter subset quantity of three, the obstacle would include a second inclined plane of mirrored relation jointing peak-to-peak with the first, thus resembling a triangular prism.

While the illustrated example in FIG. 6 shows only one simulated diagonally-moving obstacle, other scenarios may employ multiple diagonally-moving obstacles at different points along the participant path. Other scenarios may involve a combination of one or more simulated diagonally-moving obstacles, with one or more static obstacles, one or more simulated vertically-moving obstacles, and one or more simulated horizontally-moving obstacles. While the illustrated embodiment of the immersive amusement environment is an enclosed room having a path of notable width between two opposing sides of the room, thus being suitable for multi-person participation, where multiple participants can traverse the path at the same time in parallel to one another, it will be appreciated that the same layout of arrayed emitters and receivers on opposite sides of a path may be employed to similar effect in other embodiments, for example in a narrow elongated hallway traversable by only a single participant, or by multiple participants serially traversing the path one after another, rather than in parallel side-by-side relation to one another. The traversable path and the arrayed laser devices distributed thereacross may also be incorporated into a larger overall amusement experience in connection with other games or challenges.

Figure 7:
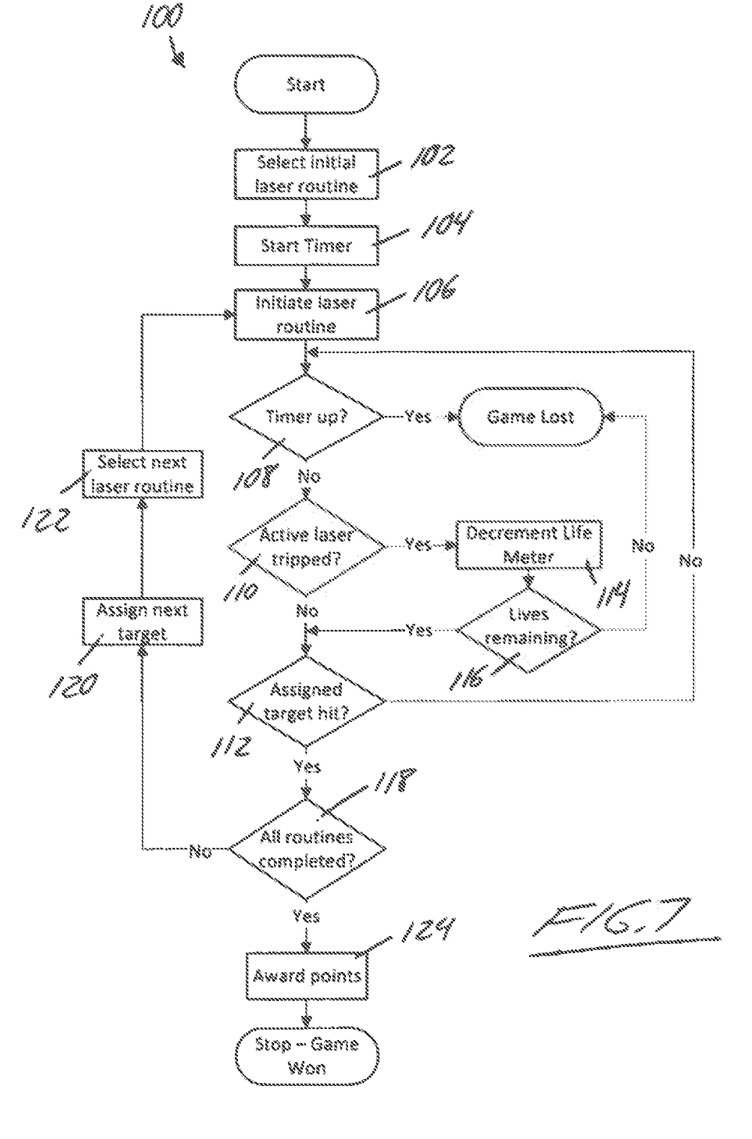
FIG. 7 is a flowchart illustrating a computer implemented process by which the room control system of FIG. 3 executes an exemplary game play session within the immersive amusement environment.

FIG. 7 shows one example of a computer-implemented process 100 performed by the controller to carry out a gameplay session in the illustrated game room 10, where the primary or exclusive gameplay task assigned to the participants is to successfully traverse the path from one end thereof in a predetermined direction and actuate the target device at the opposing end, without breaking any of the laser beams cast across the path, and then repeat this same task in the reverse direction. With each iteration, the particular laser routine executed by the controller 42 to create the laser-beam obstacles to be avoided may be varied from that executed in the preceding task, for example by varying the particular laser pattern generated, thus varying the size, shape, position and/or simulated movement of the visible obstacles, and optionally also increasing the complexity of the visible obstacle course over time, whether with each individual iteration, or periodically after a certain number of iterations of relatively similar complexity. In a simple example of such complexity escalation, a first laser routine may involve only static lower obstacles easily stepped or jumped over by the participants; with a second or later laser routine adding stationary upper obstacles to be avoided during such stepping or jumping over the lower obstacles; a third or later routine then switching to a relatively small quantity of relatively small simulated moving obstacles moving in a only a singular direction (e.g. horizontal); and a fourth or later routine then increasing in simulated moving obstacle quantity, size, and/or travel direction, and/or combining static and simulated moving obstacles.

At the first step 102 of the process 100, the game session is initialized by having the controller 42 select an initial laser routine from among a batch of pre-programmed routines encoded within the game execution software, whose executable statements and instructions are stored in non-transitory computer readable memory of the one or more local computers 48 for execution by one or more processors thereof. Via an electronic sign-in station of the room that is connected to the local computer(s) 48, the participants may be able select different game options for the given game session prior to initialization thereof, for example to select from among different difficulty levels of escalating value (level 1, level 2, level 3, etc.). To better ensure gameplay does not become predictable to repeat participants, the batch of routines for a game session may be selected randomly from among a larger pool of level-specific routines, optionally with further randomization of the order in which the batched routines are loaded and executed in the gameplay session. The sign-in station preferably resides near the entrance of the room, and preferably outside the room to enable sign-in by waiting participants while current participants are involved in a gameplay session inside, and may be used to govern the admission of participants, for example in the manner described in applicant's aforementioned U.S. provisional patent application incorporated herein.

In preferred embodiments where a gameplay session is a timed session having a predetermined time limit, then at step 104 the controller 42 starts running the timer to countdown the predetermined time limit, and shows the running countdown timer on the score display 30 throughout the duration of the gameplay session. With the timer started, the controller 42 initiates the first laser routine at step 106. During execution of the selected laser routine, the controller 42 continually monitors for: expiration of the timer, tripping of any active laser beam, and actuation of the subject target device 28A, 28B for the current iteration, as shown respectively at steps 108, 110 and 112. Initiation of the laser routine may be accompanied by activation of the assigned target device (e.g. illumination of that target device to visually alert the participant's of this target's assignment to the current task), and for example, verbal instructions conveyed over the loudspeaker to inform the participants that their task is to reach and actuate the assigned/illuminated target without breaking any laser beams.

If expiration of the timer is detected at step 108, then the game session is terminated, denoting loss of the game by the participant(s). Otherwise, the game session continues. If tripping of an active laser is detected at step 110, then at step 114, the controller 42 decrements the current value of the status meter 32 by one life or health point. In response to this detected tripping of an active laser, the controller checks at step 116 whether the value of the status meter is now zero, denoting loss of all lives or health points, in which case the game session is terminated. Otherwise, the game session continues. To prevent excessive penalization of the participant(s), the detected tripping of one active laser triggers by the controller 42 initiates a grace-period timer, denoting a time period during which tripping of any other active laser is ignored by the controller, rather than causing loss of another life or health point. The grace period is a relatively short period of time, preferably at least one second but less than five seconds, and more preferably between 1.5 and 3.5 seconds, for example measuring 2-seconds long in one preferred implementation. Accordingly, a participant's failure to clear a multi-beam obstacle, or to clear multiple single-beam obstacles that are presented in quick succession, will only be penalized one life or health point. In addition to updating the status meter to reflect the lost life or health point, the detected tripping of the active laser also preferably triggers an audible and/or visual alarm to alert participant's of the detected failure and associated penalization. The alarm may, for example, employ a sound effect or automated verbal announcement, optionally accompanied by a flashing of all or some of the lasers (e.g. that/those which was/were tripped) or some other light-based visual alert.

So long as actuation of the currently assigned target device 28A, 28B is not detected at step 112, the ongoing monitoring for timer expiration, tripped laser beams and target device actuation continues through repetition of steps 108, 110 and 112. Once actuation of the assigned target device 28A, 28B is detected at step 112, this confirm successful completion of the currently assigned participant task, i.e. successful traversal of the path to that assigned target device from the opposing end of the path from which the participant(s) started. In the illustrated embodiment, where scoring is purely timer based, this successful task completion does not trigger any accrual of scoring points to a running score tally. However, in other implementations employing such a tally, successful completion of the task may be correlated to awardal of a predetermined quantity of scoring points, the value of which being dictated by the game software programming. In such case, detected actuation of the currently assigned target device would trigger accrual of points to the running score tally maintained by the software during the gameplay session, and optionally updated in real-time on the score display 30.

In the illustrated embodiment, instead of accruing points, the controller checks at step 118 whether the entire batch of laser routines for the current game session has been completed. If there is at least one unexecuted routine remaining among the current batch, then the controller 42 prepares for the next participant task by assigning the other target device as the goal for that next task, and selecting the next laser routine of the current batch for execution during that next task, as shown at steps 120, 122. The process then returns back to step 106, and repeats the subsequent steps 108 to 118 over again, either until the session is terminated by expiration of the timer or reduction of the status meter level to zero, or until step 118 reveals that all of the batched laser routines of the current session have been completed, thereby denoting that the participant(s) has/have won the game. In the event of such a win, then final step 124 sees the controller award points to the scoring record(s) of the participant(s) according to the remaining value of the countdown timer.

In embodiments, with different user-selectable difficulty levels, instead of solely awarding a timer-based score, the awarded points at step 140 may be the sum of the remaining value of the countdown timer, plus a level-dependent bonus value that is proportional to the user-selected difficulty level. The bonus value may be the multiplication product of a fixed bonus factor and a numerical level identifier. In one example, where each difficulty level is identified by a respective integer value (Level 1, Level 2, Level 3), and the fixed bonus factor is 1000, the bonus value is therefore 1000 for Level 1, 2000 for Level 2, 3000 for Level 3, etc. By supplementing the timer-based score component with a bonus value proportional to the difficulty level, participants are more likely, or guaranteed, to achieve a greater overall score for completion of a harder level than an easier level, even if the harder level took longer to complete. So using this example, if the countdown timer counts in seconds, with each remaining second being worth one point at the end of the session, a participant who wins a Level 2 gameplay session with only 10-seconds left will earn 2010 points, while a participant who wins a Level 1 gameplay session with 60-seconds left will only earn 1060 points.

It will be appreciated that the countdown timer need not necessarily be measured in seconds. Also, the ratio between the timer value and timer-awarded point value may be varied from the forgoing 1:1 example, for example to adjust the relative weight ascribed to the difficulty level vs. the speed of completion. Ascribing a greater point value per second would afford greater weight to the speed of completion, whereby a participant completing a gameplay session at an excessively fast speed at a lower difficulty level would be able to achieve a more closely comparable score to another participant's slower completion of a harder difficulty level.

It will be appreciated that the particular gaming session described with relation to FIG. 7 is presented purely as a non-limiting example, and that the novel and inventive use of an arrayed layout of laser devices operable to emit optical beams across a participant traversable path of an amusement environment, and the novel and inventive generation of simulated traveling laser beams and variably sized visible obstacles may employed in any variety of gameplay modes and immersive amusement experiences.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An immersive amusement system comprising:
   a path to be traversed by one or more participants;
   a first array of devices mounted on a first side of said path;
   a second array of devices mounted on an opposing second side of said path in matching layout to said first array, wherein each device in the first and second arrays comprises either a beam emitter operable to transmit a respective visible beam or a beam receiver operable to detect receipt thereby of a visible beam, and the devices of the first and second arrays are setup in co-operable pairs, of which each co-operable pair comprises a beam emitter in one of said arrays that is aimed at a corresponding beam receiver in the other of said arrays; and
   a controller operably connected to devices of both the first and second arrays and configured to selectively activate and deactivate said beam emitters to cause transmission of visible beams from said beam emitters to said corresponding beam receivers, and to monitor the beam receivers for breaking of any of said visible beams by any of said participants.

2. The system of claim 1 wherein said controller is further configured to, in at least one mode of operation, activate and deactivate the beam emitters of at least one series said of co-operable pairs in sequential fashion along said series, whereby sequential activation and deactivation of said beam emitters in said series simulates a traveling beam moving relative to said path.

3. The system of claim 2 wherein controller is configured to, in at least one instance, execute an upward/downward traveling beam sequence in which the series of co-operable pairs are vertically spaced from one another to simulate an upwardly or downwardly traveling beam.

4. The system of claim 2 wherein controller is configured to, in at least one instance, execute a forward/rearward traveling beam sequence in which the series of co-operable pairs are horizontally spaced from one another to simulate a forwardly/rearwardly traveling beam moving along the path.

5. The system of claim 2 wherein controller is configured to, in at least one instance, execute a diagonal traveling beam sequence in which the series of co-operable pairs are horizontally and vertically spaced from one another to simulate a diagonally traveling beam.

6. The system of claim 2 wherein the controller is configured to, in at least one instance, execute a multi-series sequence in which multiple series of said co-operable pairs are synchronously activated and deactivated in said sequential fashion to simulate multiple traveling beams moving together in synchronous fashion.

7. The system of claim 2 wherein the controller is configured to, in at least one instance, sequentially activate and deactivate the beam emitters of said at least one series in a grouped fashion creating a simulated moving obstacle that measures multiple beams across in at least one direction.

8. The system of claim 1 wherein the controller is configured to, in at least one instance, activate the beam emitters of a plurality of adjacent co-operable pairs to create a visible obstacle that measures multiple beams across in at least one direction.

9. The system of claim 1 wherein all the beam emitters reside in the first array, and all the beam receivers reside in the second array.

10. The system of claim 1 wherein each array comprises at least one row of devices, each row comprising a plurality of devices horizontally spaced from one another.

11. The system of claim 10 wherein each array comprises multiple rows vertically spaced from one another.

12. The system of claim 11 wherein the devices in said multiple rows align with one another to form columns of vertically spaced devices.

13. The system of claim 1 further comprising a first target device actuable through physical input by said participants, said controller being operably connected to said target device and configured to, in at least one instance, monitor said first target device for actuation thereof while operating the beam-emitters according to a first routine, and upon detected actuation of said first target device, terminate said first routine and initiate operation of the beam-emitters according to a different second routine.

14. The system of claim 13 wherein the second routine is of greater complexity than the first routine.

15. The system of claim 13 comprising a second target device also actuable through physical input by said participants and also monitorable by said controller, said controller being further configured to, in at least one instance, monitor said second target device during execution of the second routine, and to terminate said second routine upon detected actuation of the second target device.

16. The system of claim 15 wherein said controller is further configured to initiate operation of the beam-emitters according to a different third routine upon said detected actuation of the second target device; and monitor the first target device for actuation thereof during execution of the third routine.

17. The system of claim 16 wherein the third routine is of greater complexity than the second routine.

18. The system of any one of claim 15 wherein said first and second target devices are situated proximate opposing ends of the path.

19. A method of operating an immersive amusement system, said method comprising:
  providing a path having disposed on opposing first and second sides thereof first and second arrays of devices, of which each device comprises either a beam emitter operable to transmit a respective visible beam or a beam receiver operable to detect receipt thereby of a visible beam, and among which the devices are setup in co-operable pairs in which each beam emitter aims the respective visible beam transmitted thereby at a corresponding beam receiver; and
  under automated control by a controller, performing a moving-beam sequence simulating one or more traveling laser beams by activating and deactivating the beam emitters of the co-operable pairs in sequential fashion along a series of said co-operable pairs.

20. A method of operating an immersive amusement system, said method comprising:
  providing a path having disposed on opposing first and second sides thereof first and second arrays of devices, of which each device comprises either a beam emitter operable to transmit a respective visible beam or a beam receiver operable to detect receipt thereby of a visible beam, and among which the devices are setup in co-operable pairs in which each beam emitter aims the respective visible beam transmitted thereby at a corresponding beam receiver; and
  under automated control by a controller, activate the beam emitters of a plurality of adjacent co-operable pairs to create a visible obstacle that measures multiple beams across in at least one direction.

* * * * *